United States Patent [19]
van Vliembergen et al.

[11] Patent Number: 5,966,503
[45] Date of Patent: Oct. 12, 1999

[54] DIGITAL COPYING/PRINTING APPARATUS AND METHOD FOR ASSEMBLING A SET OF IMAGES

[75] Inventors: Eduardus J. W. van Vliembergen; Jurek N. Deen, both of Venlo; René F. A. Collard, Gennep, all of Netherlands

[73] Assignee: Oce-Technologies, B.V., Ma Venlo, Netherlands

[21] Appl. No.: 08/871,402

[22] Filed: Jun. 9, 1997

Related U.S. Application Data

[63] Continuation-in-part of application No. PCT/NI95/00407, Nov. 30, 1995.

[30] Foreign Application Priority Data

Dec. 9, 1994 [NL] Netherlands ............................ 9402088

[51] Int. Cl.$^6$ .................................................. G06K 15/00
[52] U.S. Cl. ............................................ 395/106; 395/117
[58] Field of Search ..................................... 395/101, 117, 395/115, 116, 106; 358/474, 505, 512, 523, 435, 450, 540, 296, 444; 345/435, 510, 191; 707/515, 902; 382/318, 284

[56] References Cited

U.S. PATENT DOCUMENTS

| | | |
|---|---|---|
| 5,038,298 | 8/1991 | Matsumoto et al. .................... 364/518 |
| 5,081,494 | 1/1992 | Reed et al. . |
| 5,299,021 | 3/1994 | Gartner . |
| 5,301,262 | 4/1994 | Kashiwagi . |
| 5,309,245 | 5/1994 | Hayashi et al. ......................... 358/296 |

FOREIGN PATENT DOCUMENTS

| | | |
|---|---|---|
| 0606139 | 7/1994 | European Pat. Off. . |
| 4313958 | 11/1993 | Germany . |

*Primary Examiner*—Arthur G. Evans

[57] ABSTRACT

A digital copying/printing machine and method by which a set of images can be assembled from document images input in separate actions. This set can then be printed as a whole. Document images can be input by a scanner (physical documents) or via a connection to a digital environment, such as a network (digital document images). For digital document images, a storage unit is provided in which different images can be stored and which is provided with a selection function for selecting the required image for inclusion in the set. A separate input key is provided on the operating panel for starting an input action. Individual adjustments for the printed product can be made for each input action, e.g., for lighter or darker or single or double-sided printing. An image input in this manner is included in a set file in the memory of the machine. In response to actuation of a print key on the operating panel, the entire set file is printed.

25 Claims, 9 Drawing Sheets

DIGITAL COPYING/PRINTING APPARATUS AND METHOD FOR ASSEMBLING A SET OF IMAGES

This application is a continuation of PCT application No. PCT/NL95/00407 filed on Nov. 30, 1995, which designated the United States and on which priority is claimed under 35 U.S.C. § 120.

FIELD OF THE INVENTION

The invention relates to an apparatus for assembling and printing a set of images and reproducing the same on image supports, such as sheets of paper, and more particularly is directed toward an apparatus for assembling and printing a set of images based on external print files and scanned image data, and the corresponding methods embodied therein.

BACKGROUND OF THE INVENTION

A system and method of assembling scanned images is known: U.S. Pat. No. 5,301,262. In the known system, a set of images can be assembled from document images generated by a scanner in separate actions and can be printed after such assembly. For this purpose, a non-print mode is first set by a key on the operating panel, whereafter the digital image data of scanned documents are not printed directly, but are simply stored in a memory. In these conditions documents can be fed to the scanner by an automatic feed unit or be manually placed on the glass platen forming part of the scanner. The starting key on the operating panel has to be actuated to start the scan action for each document or stack of documents (in the case of an automatic feed unit). The set of images thus built up can be printed by leaving the non-print mode and actuating the start key.

If the non-print mode has not been set, the start key has the function of starting a complete copying cycle, comprising scanning and printing. Its function is thus changed by setting the non-print mode.

The known system offers the possibility of assembling documents of different types to form a set. These documents, however, must all be physical documents because they must be scanned by the scanner. Due to developments in information processing, however, documents are increasingly available only in digital form. If these "documents" are also to be added to the set assembled by the system of the '262 patent, a print of the digital information must first be made so that this print can be scanned by the scanner. This not only entails extra work, but the consecutive actions of printing and then scanning may result in a loss of quality. It is therefore desirable to be able to add information in digital form as well to the set of images.

Other systems for assembling and printing a set of images are known from U.S. Pat. Nos. 5,081,494 and 5,299,021. The common feature of these known systems with the '262 patent described above is that they also can only process physical documents.

SUMMARY OF THE INVENTION

The object of this invention is to obviate the said disadvantages of the known systems, to which end, there is provided an apparatus and method comprising: an electro-optical scanner for generating digital image data corresponding to an image; an inputting unit for receiving data fed from an external digital environment and corresponding to images, and generating digital image data corresponding thereto; a storage unit for temporary storage of image data generated by the scanner and the inputting unit; a printing unit for printing on image supports images corresponding to image data in the storage unit; an operating unit provided with operating device operable by an operator; a control unit connected to the scanner, the inputting unit, the storage unit, the printing unit and the operating unit, said control unit being adapted so as to control the scanner, the inputting unit and the storage unit in response to an associated command from the operating unit, each time the digital data (generated by the scanner) are stored in or added to a set file in such manner that image data generated in separate actions by the scanner are assembled in the storage unit to form the set file, and the control unit being adapted to cause the set file to be completely printed by the printing unit in response to an associated command given from the operating unit. Consequently, the control unit can also add to the said set file a digital image data file supplied via the inputting unit. The term external "digital environment" is intended to denote a local network to which one or more workstations are connected, a directly connected workstation, a read-out station for a digital storage medium, such as a floppy disk drive, and so on.

In one attractive embodiment, the inputting unit stores, in a memory, a digital image data file supplied from an external digital environment. A selection function is provided for selecting a data file so stored in the memory for the purpose of adding the same to the set file in the storage unit.

In this way it is possible to send various files to the system, and a choice can be made from these as required.

In the known systems, the mode in which a set of images is assembled is generally initiated by actuating a key. Printing of the set is possible only after the mode has been left, again by actuation of a key. In the collection mode, the machine starting key, which normally results in a complete copying cycle, has the function of adding an image to the set. A change of function of this kind may be confusing to an inexperienced user.

To obviate such possible user confusion in the system according to the present invention, a separate key is provided on the operating panel. This key is at all times reserved for the creation of a set file and for the addition of a digital image data file to said set file or, if a set file has already been created, the addition of a digital image data file to said set file.

In another embodiment, this separate key is operative both for data files generated by the scanner and for data files supplied from a digital environment. Consequently, all the actions for adding an image to the set are started with the same operating element. This is an advantage in respect of consistency of the machine behavior and hence ease of operation.

In a further embodiment, the images added to the set are also immediately printed once. The advantage of this is that if only one print was required it is ready immediately after assembly of the set and there is therefore no longer any need to await printing.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein . . .

DETAILED DESCRIPTION OF THE PREFERRED EMBODIMENTS

Figure 1:
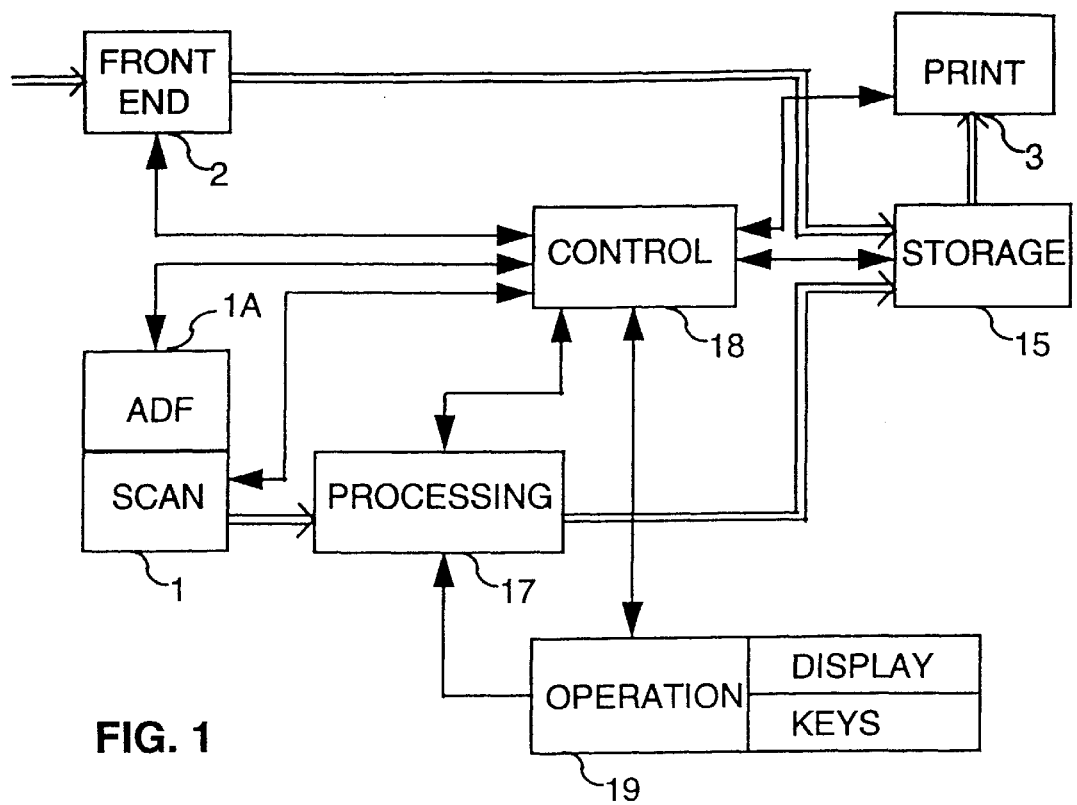
FIG. 1 is a diagram of the general layout of the system according to the invention.

FIG. 1 shows the general layout of an image reproduction apparatus according to the invention. The apparatus comprises a scanner 1 for electro-optical scanning of a document and for delivering digital image data corresponding thereto, an automatic document feeder unit 1A, a processing unit 17 for image data supplied by the scanner 1, an inputting unit or front end 2 for receiving image data from a external source, such as a network, and a printing unit 3 for printing digital image data on a support material such as paper or transparent overlays, etc.

The apparatus also comprises: a storage device or buffer 15 for storing image data, the storage device being connected to the processing unit 17, the front end 2 and the printer 3, the storage device being operative as a buffer between the parts 1 and 2 which generate the print data and the part 3 of the system, which processes the print data; and an operating unit 19 provided with an operating panel having a display and operating elements, e.g., keys, connected to the processing unit 17. Finally there is a central control unit 18 connected to all the other elements.

Figure 2:
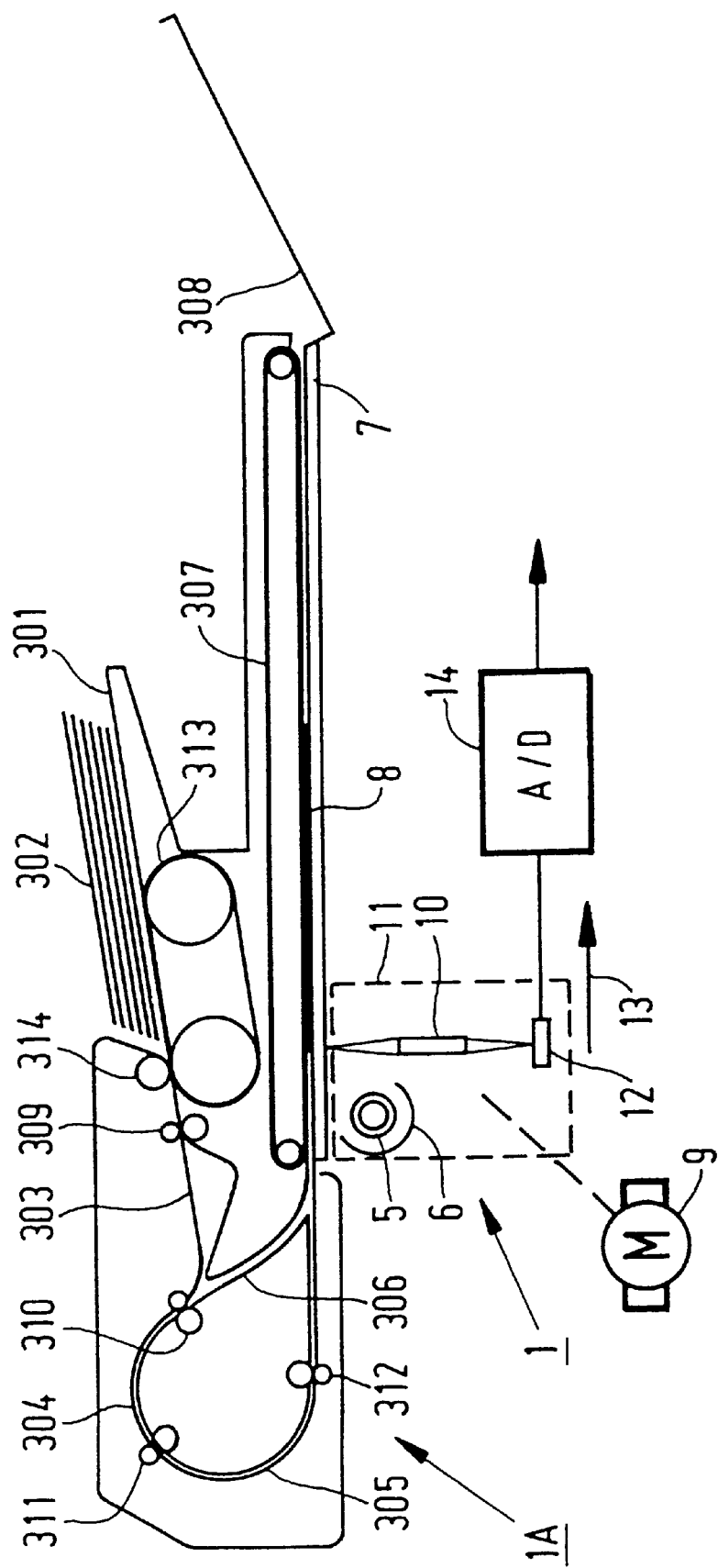
FIG. 2 shows the scanner system of FIG. 1 with an automatic document feeder.

The scanner 1 is shown in greater detail in FIG. 2. It is provided with a tubular lamp 5 and a reflector 6 co-operating therewith, by which a narrow strip of a document 8 placed on a glass platen 7 is illuminated. The scanner also comprises an array 10 of imaging glass platen fibers (a "selfoc lens array") whereby the light reflected by the document is projected on to a sensor array, e.g., a CCD array 12. The lamp 5, reflector 6, selfoc lens array 10 and CCD array 12 are combined on a carriage 11 which, during the scanning operation, is advanced at a uniform speed in the direction of arrow 13 by a servomotor 9 so that the document 8 is scanned line by line by the CCD array 12. The position of the carriage 11 is continuously measured with generally known hardware in a generally known manner and is used inter alia for the feedback circuit of the servomotor 9.

Using the scanner 1, each image dot of the document is converted into an analogue signal which corresponds to the grey value of that dot. The analogue signal is then converted to a digital signal for each image dot by an A/D converter 14.

The scanner 1 is provided with an automatic document feeder (ADF) 1A. This comprises an entry tray 301 for documents 302, into which they should be placed with the front, i.e., the printed side if only one side is printed, facing down. The unit 1A also comprises a first transport path 303, a second transport path 304, 305 and a third transport path 306, and also a conveyor belt 307 situated opposite the glass platen 7, and a delivery tray 308. The transport paths are formed by guide plates and driven pairs of rollers 309, 310, 311 and 312. A separating belt 313 co-operates with a separating roller 314 to remove the documents 302 one by one from the bottom of the stack and for feeding a separated document to the first transport path 303.

The connection between the first transport path 303 and the second transport path 304 is such that documents are fed automatically from the first transport path 303 to the second transport path 304 but are fed from the second transport path 304 to the third transport path 306 with a reverse movement.

A one-sided document is fed from the first transport path 303 to the second 304 until it has completely left the first transport path 303. The direction of transport is then reversed and the document is fed via the third transport path 306 to the transport path 307 which positions it on the glass platen. On completion of the scanning operation, it is then fed to the delivery tray 308.

A double-sided document is first fed by the first (303) and second (304, 305) transport paths to the glass platen 7, where the back is scanned, and is then returned and again fed via the transport paths 305, 304 and 306 in the inverted position to the glass platen 7. After the front of the document has been scanned it is delivered to the delivery tray 308. As a result of this procedure, the scanner scans the front and back of the document in the wrong sequence, but this is subsequently corrected upon storing the image data into the storage device 15, by adapting the storage device management system.

Figure 3:
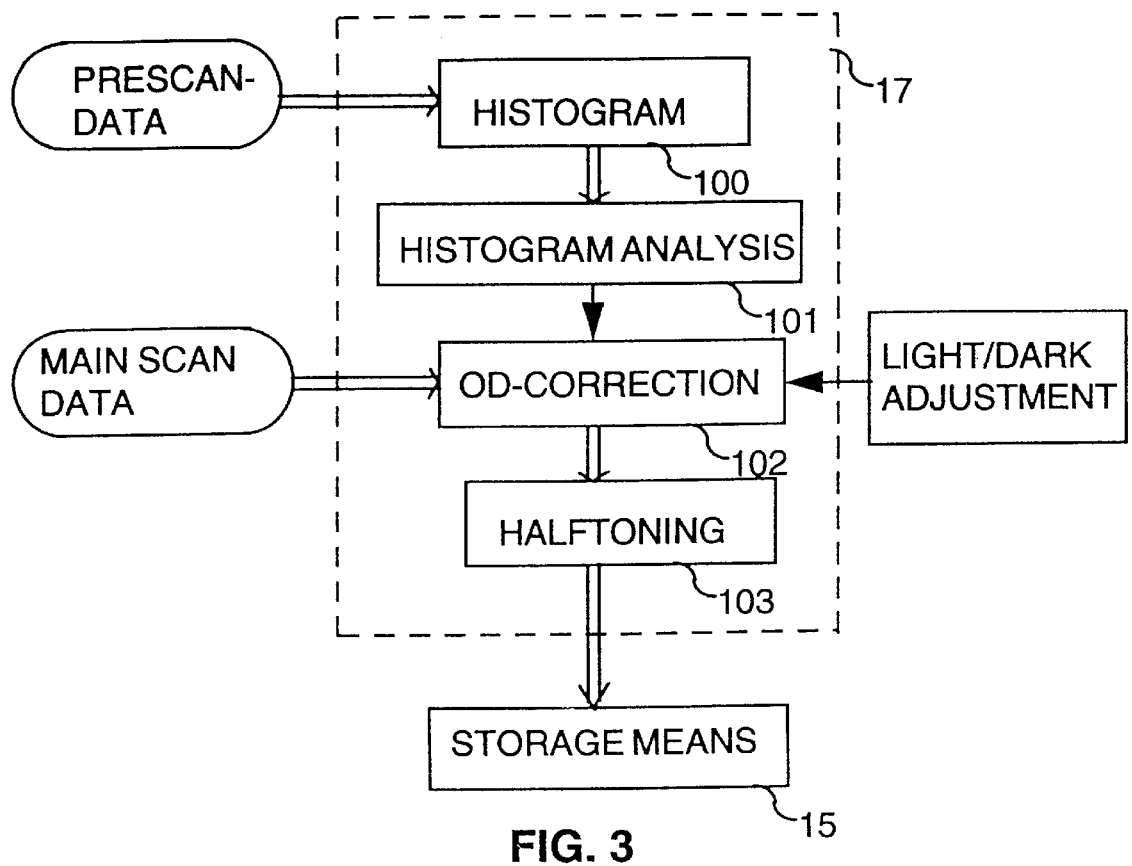
FIG. 3 is a block diagram of a processing module of FIG. 1 for digital image data.

FIG. 3 is a block diagram of the processing unit or module 17 for converting digital signals from the scanner 1 to binary image data suitable for controlling the print unit 3. The module 17 comprises: a histogram module 100 which receives signals from the scanner 1; an analysis module 101 connected to the histogram module 100, an OD correction module 102 connected to the analysis module 101 and to the operating unit 19, the analysis module 101 also having an input for signals from the scanner 1; and also a half-tone module 103 connected to the OD correction module 102 and to the storage device 15.

Scanning a document on the glass platen is effected in two phases. In the first or pre-scan phase, the scanning carriage 11 moves along the document 8 and in so doing delivers digitized signals corresponding to the measured optical density of a first raster of image dots of the document image. These signals are used to characterize the type of document, so that an appropriate processing of the scanner data can be selected. In the second or main scanning phase, the scanning carriage 11 moves along the document 8 in the reverse direction and again delivers digitized signals which this time correspond to the measured optical density of a second raster of image dots of the document image. The first and second rasters may be identical, but the first raster may be more coarse such that fewer image dots are surveyed.

Figure 4A:
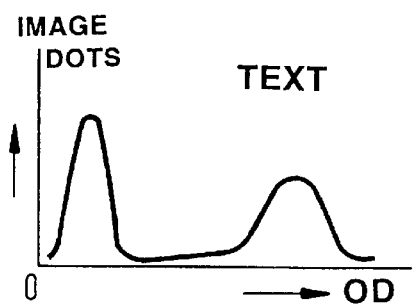
FIGS. 4A and 4B depict two histograms of grey values.
Figure 4B:
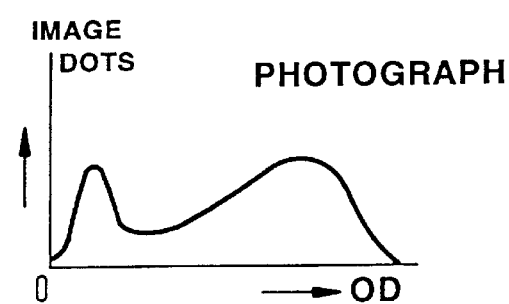

The scanner signals from the prescanning operation are delivered to the histogram module 100, which makes a histogram of the measured values. After completion of the prescanning operation, the results of the histogram module are passed for analysis to the analysis module 101. The latter characterizes the scanned image as a text image or a photographic image. FIG. 4 shows two characteristic histograms, one for FIG. 4A depicts a text image and FIG. 4B depicts a photographic image. The x-axis shows the optical density (OD) and the y-axis the number of image dots (N). A text image contains two relatively narrow and tall peaks corresponding to the white of the paper and the black of the characters. Grey values therebetween are less frequent and originate mainly from image dots situated just at the edge of a character. On the other hand, the histogram of a photographic image contains many grey and fewer white and black image dots. By reference to preprogrammed criteria the analysis module now determines whether the histogram belongs to the text type (with two distinct peaks) or the photographic type (with a more continuous distribution) This decision is transmitted to the OD correction module 102.

In the OD correction module 102, the grey values of the digitized scanner signals from the main scan are converted to other grey values in accordance with a preselected characteristic. The module 102 contains a number of different characteristics and selects one on the basis of the signals from the analysis module 101 and on the basis of a light/dark setting selected by the operator using the operating panel of the operating unit 19.

Figure 5A:
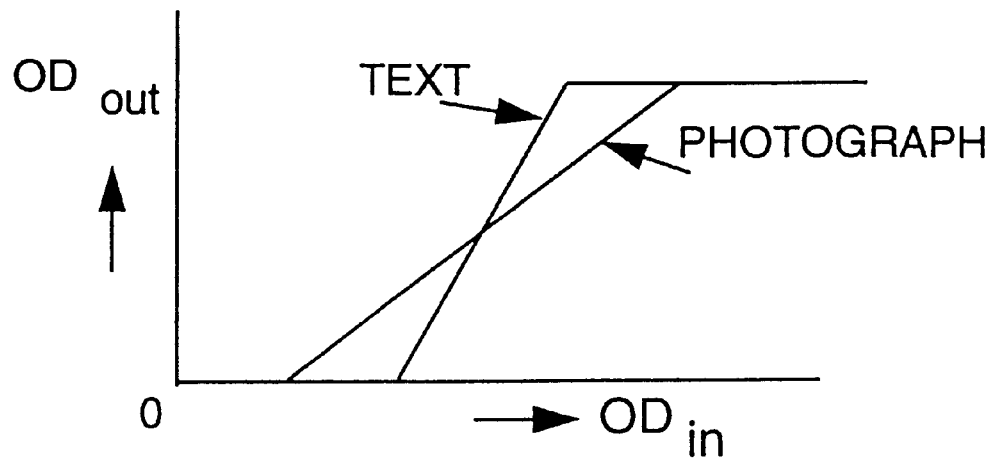
FIGS. 5A, 5B and 5C show an OD correction characteristic.

FIG. 5A shows an example of the characteristics for a text image and a photographic image respectively in the case of light/dark setting set to zero. It will be apparent from this that a text image is imaged hard, i.e., light tones are made white and dark tones black, while only a small number of middle tones are reproduced as grey. Consequently, the resulting printed image contains mainly black on white, and this is usually what is intended with a text image. On the other hand, a photographic image is reproduced much more softly. Most of the grey tones are imaged as grey tones and only a relatively small number of grey tones at the end of the range is converted to white and black, respectively.

Figure 5B:
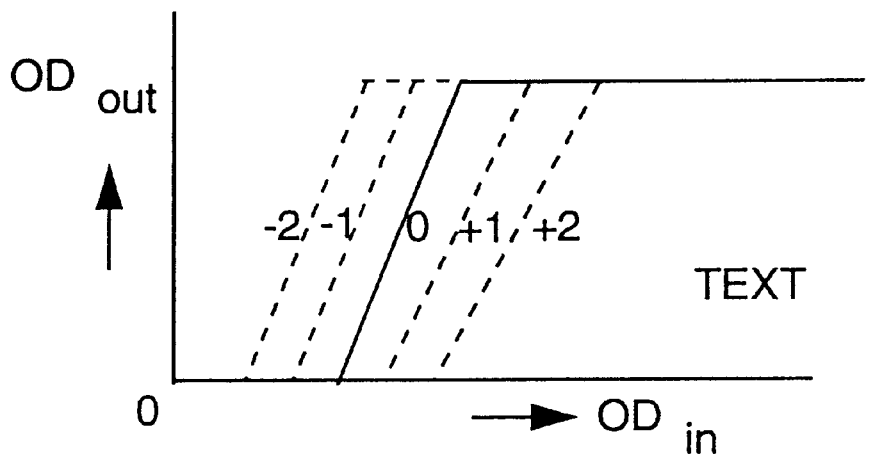
Figure 5C:
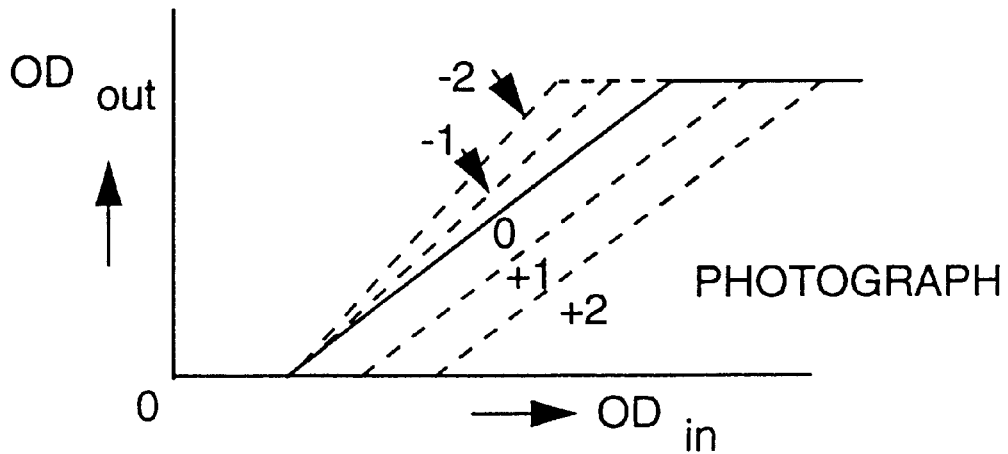

FIGS. 5B and 5C show the adjustment of the characteristics on a change from zero of the light/dark setting by the operator. The adjustment differs with text and photographic images, respectively. In the OD correction module 102, the various characteristics are stored in digital tables corresponding to the curves depicted in FIGS. 5B and 5C.

The image data converted in the OD correction module 102 are then converted to binary data in the half-tone module 103 in a generally known manner, such as a dither technique or error diffusion technique or a mixed form thereof, for example. These techniques are generally known and need not therefore be explained further. Also, one of ordinary skill in the art would understand that the OD correction, which is described here as a separate processing of the scanner signals, can also be integrated in the half-tone method.

The binary image data are now suitable for processing by the system printer unit 3. While awaiting this they are stored in the storage device 15, in compressed form if required.

Figure 6:
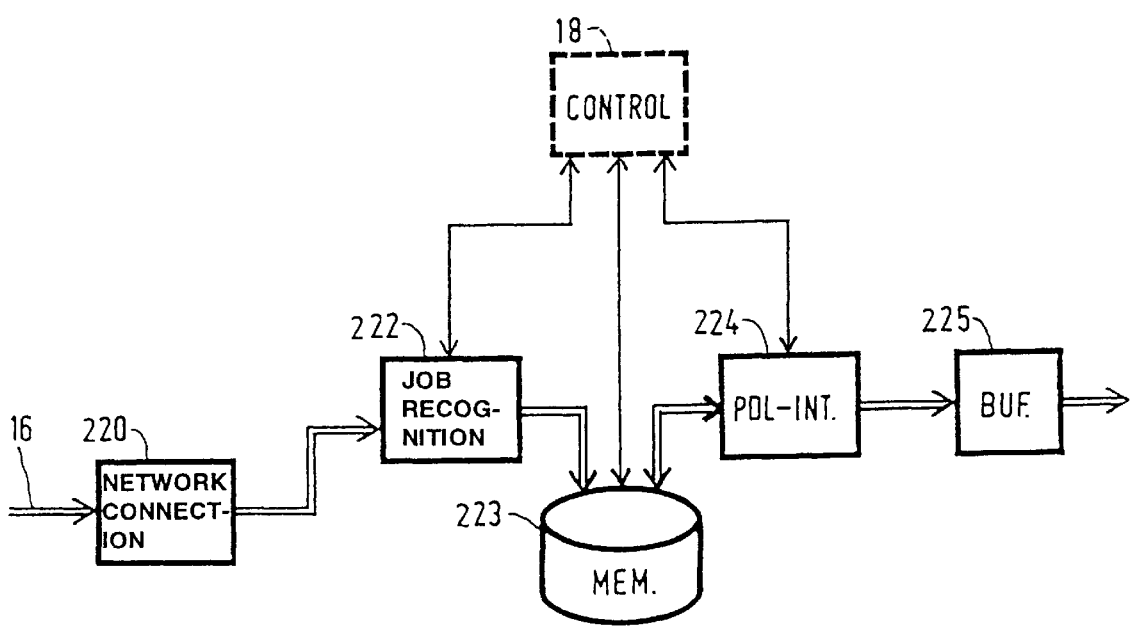
FIG. 6 is a diagram showing a unit for supplying digital image data from an external source.

The unit 2 for supplying digital image information from an external source, or the "front-end", is shown in FIG. 6. This unit is provided with a network connection unit 220 connected to an external network 16, to which a number of workstations, for example, can be coupled. These workstations can send data files in various generally used formats (page description languages such as PCL, PostScript, etc.) via network 16 for printing. The technique of networks and the sending of data files over the same is generally known and need not be explained here.

The connection unit 220 is connected to a job recognition module 222 which is in turn connected to a hard disk 223. The job recognition module 222 determines the page description language (PDL) used for each data file supplied and extracts identification data contained therein. In network systems, transmitted data files are always provided with identification data. These data usually contain the name of the sender (owner) of the file and the name of the file itself. These data are extracted by the job recognition module 222.

The hard disk 223, intended for interim storage of a supplied data file, is also connected to a PDL interpreter 224 for converting a data file coded in a page description language into a form suitable for processing by the printer unit 3. This processing is generally known as "rasterization". The PDL interpreter 224 is connected via a buffer 225 to the intermediate storage device 15. The job recognition module 222, hard disk 223 and PDL interpreter 224 are also each connected to the control unit 18.

In the system described here, when a data file is supplied via the network, a print is usually not made thereof immediately, a command from the operating panel being awaited.

The procedure when a print order enters via the network is as follows (see FIG. 6). A data file for printing supplied by a workstation via the network 16 is transmitted by the network connection unit 220 to the job recognition module 222. This extracts a number of predetermined identification data from the file, examines the file to recognize the page description language (PDL) used, and transmits these identification data and PDL to control unit 18. In this example, the extracted identification data comprise the name of the owner and the name of the file itself. The file is then stored unchanged on the hard disk 223, after which the system passes into the stand-by condition.

Control unit 18 manages a list containing the identification data of all the data files for printing stored on the hard disk 223. If a new file is supplied via the network, then the control unit 18 adds the identification data thereof to the list. Whenever a data file has been printed, the control unit 18 removes the identification data of that file from the list.

If an operator now wishes to print a specific data file, he must give a command for this purpose by using the operating panel of the operating unit 19. In response thereto, the data file is brought up from the hard disk 223 and converted by the PDL interpreter 224 into printable data which, after intermediate storage in storage device 15, are printed by the printing unit.

The system construction can also be such that data files supplied from the network 16 are immediately converted into printable data and then stored in the storage device 15. The list referred to above then contains the data of the supplied and converted files.

During the making of a print, binary image data of an image are fed from the storage device 15 to the printing system 3 under the control of the control unit 18.

The printing system 3 is an electrophotographic processing unit, in which a photoconductive belt is charged and exposed image-wise by an LED array fed with the binary image data. The remaining charge image is developed with toner powder, whereafter the image formed by the toner powder is transferred to a receiving medium, e.g., a sheet of paper, and fixed thereon. Processing modules of this kind are generally known and therefore no further explanation is provided. Moreover, the invention is not restricted to the printing technique described here; other printing systems, such as laser or ink jet printers, can also be successfully used in a system according to the invention.

Figure 7:
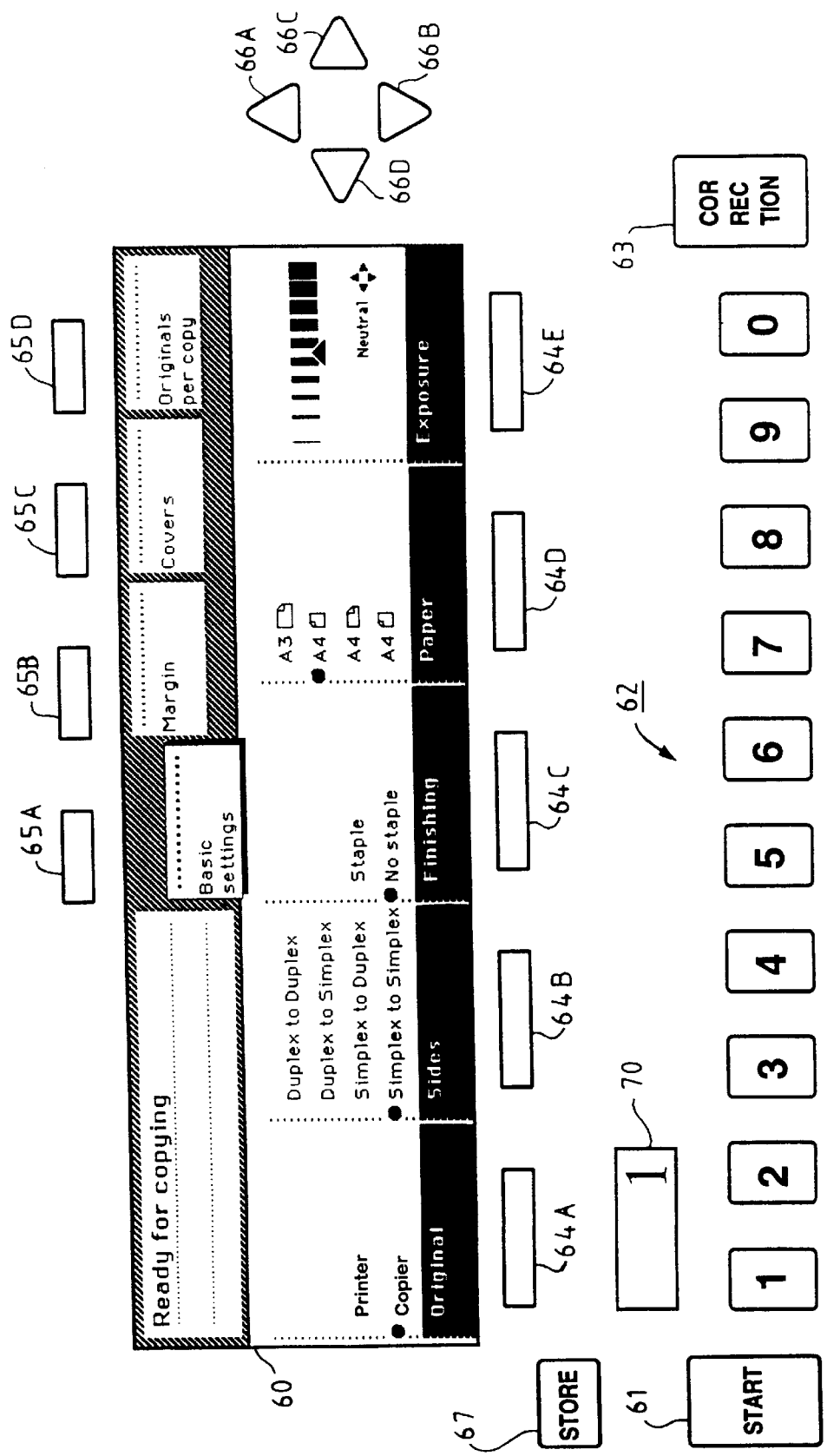
FIGS. 7 and 8 show the operating panel of the system according to the invention.

The operating panel associated with the operating unit 19 is shown in FIG. 7 and comprises a display screen 60, e.g., an LCD display, and a number of keys, namely a start key 61, digit keys 62, a correction key 63, a storage key 67 and selection keys 64A–E, 65A–D and the star key cluster 66A–D. The star key cluster comprises the keys 66A (up), 66B (down), 66C (to the right) and 66D (to the left). All these elements are connected to the operating unit 19 which, in response to operation of the keys, transmits signals to the control unit 18 and also controls the screen 60 to display the selection options and messages to the operator.

When the system is switched on, the screen 60 shows an image formed by a number of vertical columns each situated above one of the selection keys 64A–E. Each column relates to a specific basic function of the system and shows the various possible settings of this basic function. For example, the furthest left-hand column is allocated to the choice between copying mode, in which a document is scanned by the scanner and then reproduced, and the printer mode, in which a print is made from digital image data fed via the network connection. Whichever setting is selected at any particular time, in this case the copying mode, is indicated by a symbol, e.g., a dark dot, or by highlighting.

By actuating a selection key an operator can select a different setting, e.g., in accordance with a cyclic scheme. As a result of a change of a setting, the function of one or more of the other selection keys may change, because the old function is no longer relevant and the other selection options are what are required. Other texts applicable to the new function then appear in the associated column of the screen 60.

The selection keys 65A–D offer the possibility of calling up another set of functions (headings), which cannot be displayed owing to the limited dimensions of the screen 60. Generally, these are functions which are not required for a simple copying or printing job, but which offer the operator more options for obtaining special printing results. In this example, these functions comprise shifting the margin on the print, adding covers and multiple-up. The meaning of the keys 65A–D is indicated in an associated field on the screen 60, directly beneath each key. When one of the keys is actuated, a corresponding set of functions is activated and the make-up of the screen 60 is adapted to the associated functions. At the same time, this selection is displayed by framing or otherwise making conspicuous on the screen 60 the field belonging to the actuated key of the group 65A–D.

The columns above the keys 64A (already referred to), 65B (single-sided or double-sided, both with respect to the original document and the copy sheet), 64C (stapling) and 64D (the choice of format of printing paper) relate to the finishing of the work order requested by the operator.

The column above key 64E is intended for changing the light/dark setting by which the copy can be made lighter or darker. The chosen setting is transmitted to the processing module 17, more specifically the OD correction module 102, which reacts there in the manner described in connection with FIGS. 5B and 5C. The relevant setting is shown graphically by an arrow head on a bar of increasingly narrow black strips. There is also a description of the relevant setting in the column, in this case "neutral". Other descriptions are "lighter" and "darker". The setting can be changed by the cluster keys 66C and 66D. This is displayed to the operator by showing the star symbol in the column.

The operating panel also contains a digit display 70 for showing the number of prints set, as is conventional on copying machines.

The function of the storage key 67 will be explained in detail hereinafter.

Figure 8:
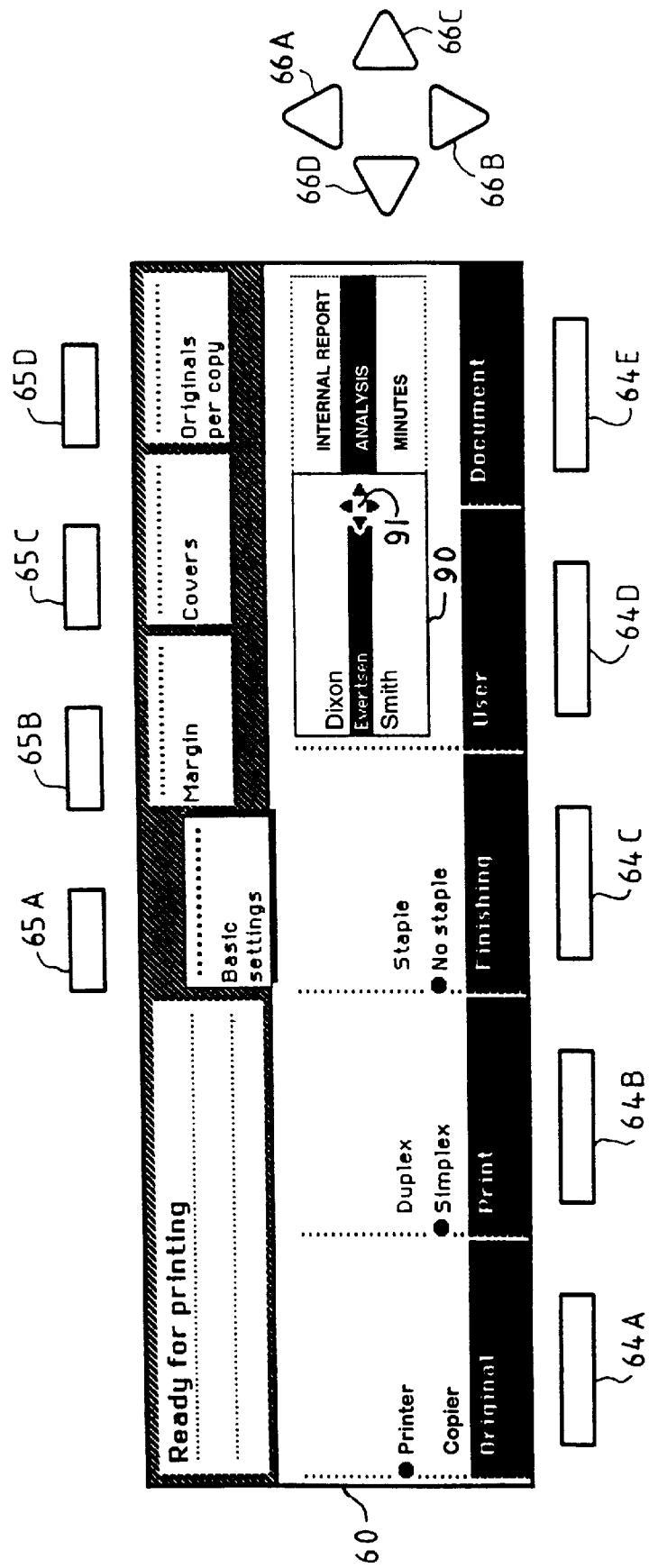

FIG. 8 shows the make-up of the screen 60 after the printing mode has been selected in the "basic settings" using key 64A. In this case the function of key 64B changes inasmuch as it is now possible only to set "single or double-sided" in respect of the print. The keys 64D and 64E also now have the function of specifying the data file for printing by selecting the user and file name. Various files from different users may be stored in the memory 223. All these files are recorded in the list of the control unit 18, as described hereinbefore, and can be displayed on the screen 60 for selection.

After actuation of key 64D, an operator can select a user name from the list of users who have sent one or more files, and after actuating key 64E a file name can be selected from the list of files sent by the selected user.

On selection of the print mode with key 64A, the system also automatically comes into the same condition as after actuation of key 64D. In that case, the key 64D does not have to be re-actuated.

In response to actuation of key 64D (or 64A), the column of the screen above this key is provided with a frame 90 and a star symbol 91 to show that a user name can be selected and that the star keys 66A–D are operative for that selection. As an automatic pre-selection, the name is selected of the user who last sent a file to the system. Alternatively, the first user name could be taken in alphabetical sequence or any other preference.

The pair of keys 66A/B is used for scrolling alphabetically through all the user names, forward by key 66A and backward by key 66B. If there are more names than can be displayed simultaneously in frame 90, then the display shows as many names as can fit within the frame and the whole list is scrolled through automatically. A bar 92 with text therein in reverse video shows what name has been selected.

In response to actuation of key 64E the column of the screen above this key is provided with a frame and a star symbol in the same way as the procedure on actuation of key 64D as described above, to show that a file name can be selected and that the keys 66A–D are active for that selection. The selection with the star keys is completely identical to that for selection of a user name. The last file sent, for example, is chosen as a pre-selection.

The file thus selected is printed on actuation of the start key 61.

With the system described above, it is possible to assemble a set of images from a number of images input in various ways, both scanned documents and files of digital image data, and print this set as a whole. The storage key 67 on the operating panel is used for this purpose.

Actuation of storage key 67 has the same results as actuating the start key 61, except for starting the printing procedure. Thus, digital data are generated and stored in the storage device 15, but the control unit 18 then passes to the stand-by mode. In this mode, an operator can define a new image by placing a document in the ADF entry tray or on the glass platen or by selecting a digital data file. On actuation of the storage key 67 the control unit 18 is re-activated and the scanner 1 or front-end 2 starts up. The digital image data then generated are added to the file already stored in the storage device 15.

If start key 61 is actuated in the stand-by condition, the control unit 18 starts the printing system 3 and causes the built-up set of images in the storage device 15 to be printed by the printing unit 3.

The functionality of assembling a set of images offers a number of extra options which are not otherwise available, such as individual processing of the image data of each original separately (e.g., making them lighter or darker), making collected copies of a set of documents which have each been placed separately on the glass platen manually, and making double-sided copies of documents manually placed on the glass platen.

Figure 9A:
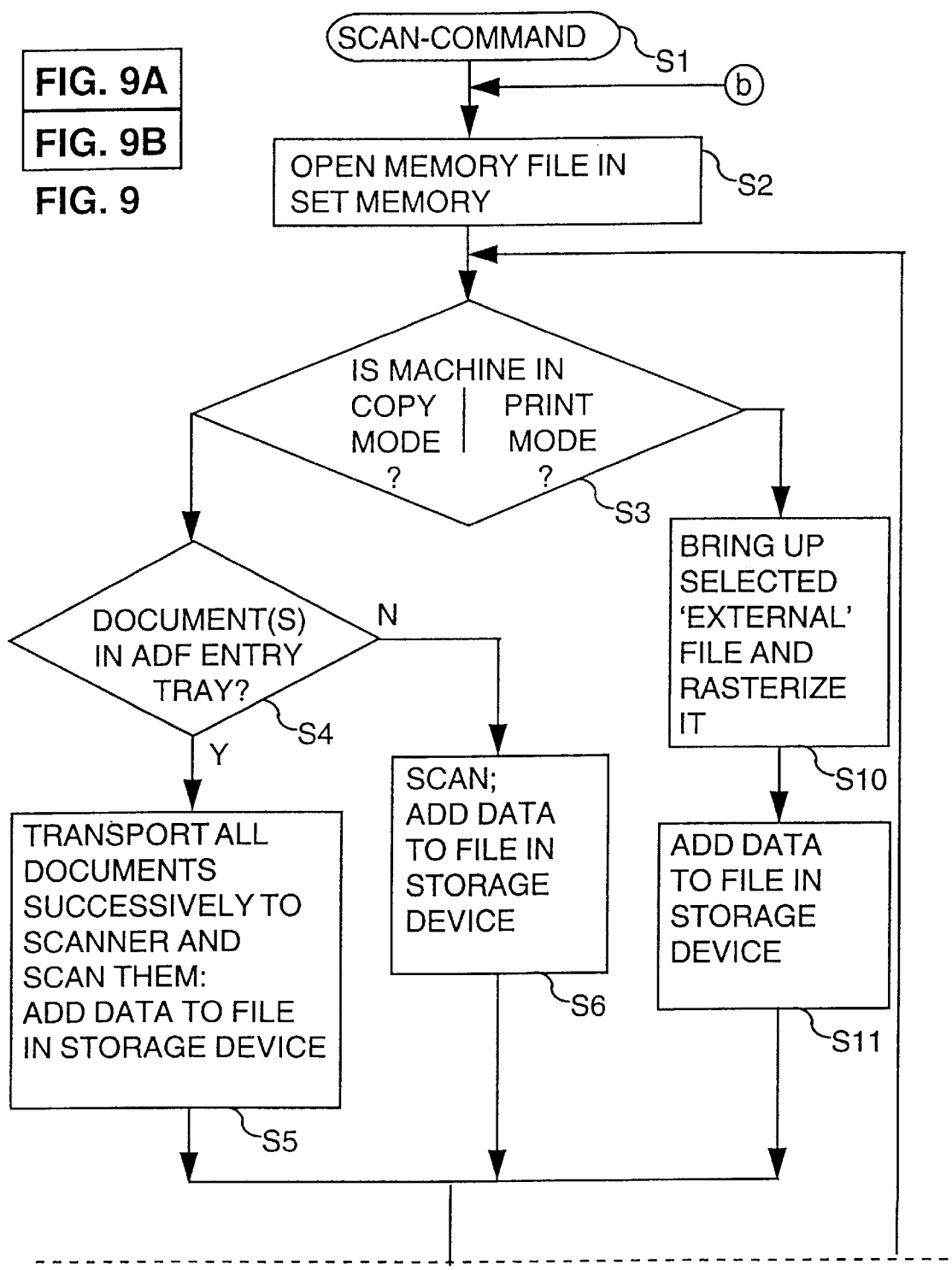
FIGS. 9A and 9B depict a flow diagram of the process for the assembly of a set of images according to the invention.
Figure 9B:
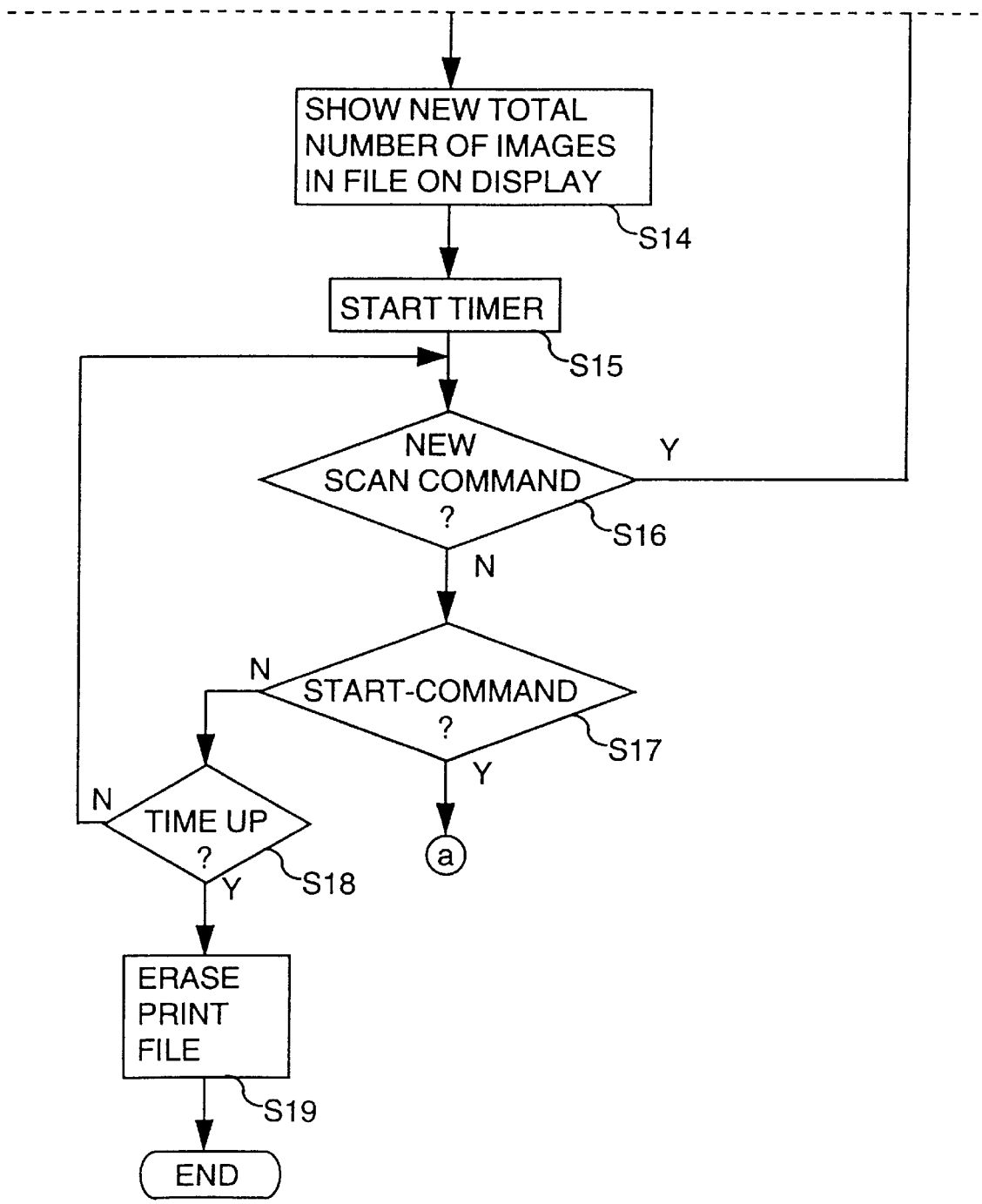

FIG. 9 is a flow diagram of the process for assembling a set of images.

The process starts when the storage key 67 is first actuated after completion of a preceding printing process or a period of rest. In the drawing, this is depicted as step S1, "scan command", which in this connection is also considered to refer to the rasterization of digital image data from an external source. The operator will already have placed a first original document in the ADF entry tray or on the glass platen or selected a digital original via the operating panel, and also selected specific settings for the printing on the operating panel.

If the operator now actuates the storage key 67 (S1), then the process for assembling and printing a set of images by the control unit starts. The control unit 18 opens (S2) a new file for print data in the set memory, i.e., storage device 15, this print data hereinafter being referred to as the print file, and then checks whether the copying or printing mode has been set by the operator using key 64A (S3). In the former case, the first original is a physical document, while in the second case it is a digital data file. The message field on the top left of the screen 60 displays the message "image is added to print file". This field also always displays the total number of document images stored in the storage device 15.

If the copying mode is set, then the control unit 18 checks whether there is a document in the ADF entry tray (S4). If this is the case, then the control unit 18 starts the ADF in order to bring the document, or if there is more than one document in the entry tray, then all the documents in succession, from the entry tray to the glass platen. Each document is scanned by the scanner 1 and the image signals from the scanner, after being converted to digital signals, are passed to the processing module 17, which converts them to digital image data in accordance with the settings on the operating panel, such as, for example, the above-described light/dark setting. These image data are stored in the print file in the storage device 15 (S5) together with control data for the printing unit, such as the format of the printing paper (for each print separately).

If the test in step S4 shows that there is no document in the entry tray of the ADF, then it is assumed that an original has been placed on the glass platen and the ADF is not started. The scanner 1 is then moved and the original on the glass platen is scanned, whereupon the image signals are again converted to digital image data by the processing module 17 and stored in the print file in the storage device 15 (S6).

It should be noted, here, that the operating panel is fully operational with respect to the properties of the images to be added to the set.

If step S3 shows that the system has been set to the mode for printing files of digital image data from an external source, then the control unit 18 checks what file has been selected on the operating panel, brings the selected file from the hard disk 223 of the front-end 2 and rasterizes it (S10). It is then stored in the storage devices 15 in the print file together with any printing settings selected on the operating panel, or else, if this is not the first image, it is added thereto (S11). Just as in the copying mode, the operating panel is fully operational.

After new images have been added in the manner described hereinbefore, the total number of document images stored in the print file in the storage device 15 is adjusted in the message field at the top left of the screen 60 (S14), and after this the system awaits a new order.

Directly after completion of step S14, a time counter is started (S15) and if no keys are actuated within a certain set time (S18), then the time counter erases the print file from the storage device 15 (S19) and terminates the process. The object of this is to prevent the image data of a set from remaining in the storage device and from being printed during a following copying order if the operator, no matter why, does not print the assembled set of images.

In the meantime, the control unit 18 checks whether the storage key has been actuated again (S16), so that a new image or a new series of images is added to the set in accordance with the above procedure as from step S3. The stand-by mode corresponds to the loop in the flowchart 9B containing the steps S16, S17 and S18. If the scanning key is not actuated but the start key 61 is actuated (S17), then the control unit passes to the print mode, in which the assembled set of images is printed as a whole.

During the stand-by state it is possible to erase, from the print file, the image data of the last images input. For this purpose the operator can actuate the correction key 63 on the operating panel of the operating unit 19. In response to this, the image data added on the last input action are removed again. This can affect a number of images if the last input action has involved a set of documents (from the ADF) or digital images (from the front-end). Alternatively, the removal action can be implemented in such manner that actuation of the correction key 63 always results in removal only of the image data of the very last image, possibly followed (in the event of the last input action involving a number of images) by a message on the screen to the effect that if the correction key is again actuated the entire last group of images will be erased. Of course, after removal of one or more images the total number of document images stored in the storage device 15 is adjusted on the screen.

Figure 10:
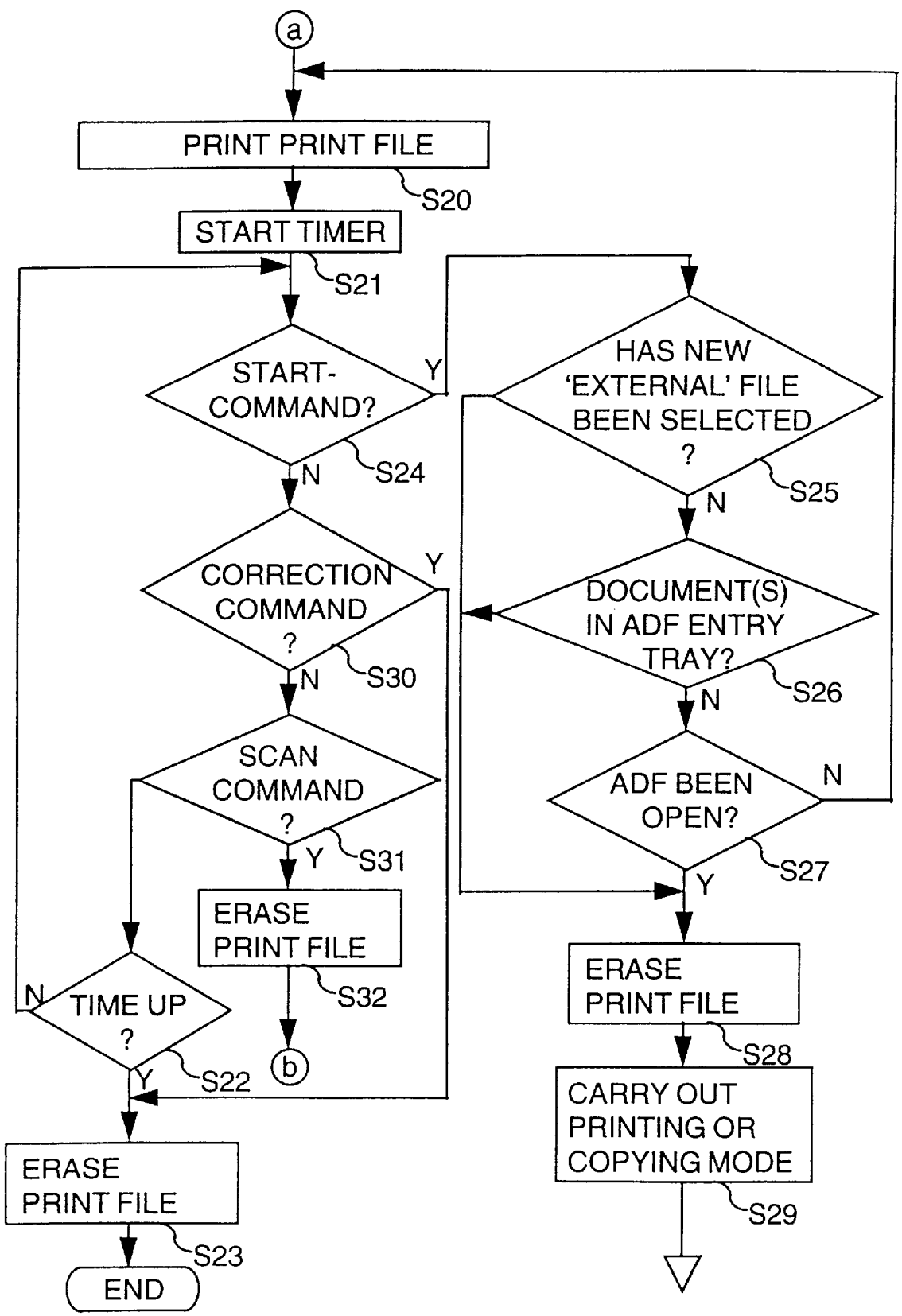
FIG. 10 is a diagram of the printing process for a set of images according to the invention.

FIG. 10 shows the flow path of the printing process following the assembly of a set of images as described above.

Before the operator actuates the start key 61 for starting the printing process, he can still set the number of prints by the keys 62. With regard to the finishing of the prints he can also make settings which have not already been established on assembly of the image set. Settings which can still be made are those which relate to finishing the package as a whole, such as stapling, adding covers, insertion of blank pages, etc.

When the operator then actuates the start key 61, the control unit 18 starts the system printer 3, which in turn prints the complete set of images in the desired number of prints and according to the given settings (S20). The operating panel display then displays the message: "Print ready; actuate start key for printing again or correction key for removal of image data".

Directly after completion of the printing process, a time counter is started (S21) and if no keys are actuated within a certain set time (S22), the time counter erases the print file from the storage device 15 (S23) and terminates the process.

If (S22) the start key 61 is again actuated within the time being counted, possibly after a new value has been set for the number of prints, the control unit 18 first checks whether there are any instructions indicating that this start command is intended for an entirely new order. For this purpose, the control unit checks whether (S25) a new digital file supplied from an external source and stored in the front-end 2 has been selected, or whether (S26) there are documents in the ADF entry tray 301, or whether (S27) the ADF has been open since the previous start command (S17). The latter shows that a document has been placed on the glass platen 7. If none of these conditions is met, the control unit 18 starts the printing system 3 again to make the required number of prints. If one of these conditions is satisfied, then the print file is erased from the storage device 15 (S28) and the control unit 18 finishes the apparently required new printing or copying order.

The possibility of making a print again is intended to give the operator the opportunity to check the printed set. Of course, it is possible that a mistake has been made in assembling the set, for example, because the sequence is incorrect. If the operator first wishes to check that the set is correct, he can therefore first make a print and if this is in order set the system to print the full number. Similarly, the settings applicable for printing the entire packet can also be changed then.

If the correction key 63 is actuated instead of the start key 61 during the time counter time interval (S30), the control unit 18 erases the print file from the storage device 15 (S23) and terminates the process.

If the storage key 67 is actuated (S30) within the time counter interval, showing that the operator wishes to start a new assembly process, the control unit 18 erases the print file from the storage device 15 (S32) and starts the new assembly order.

It should be noted that the term "printing process" should be understood here as meaning also writing the print order into a queue if orders made earlier are still awaiting completion. This has no further consequences for the procedure described in FIG. 10.

In an alternative embodiment of the system according to the invention, the procedure according to FIGS. 9 and 10 is altered so that, during the assembly of the set of images, the image data of the added image or images are not only included in the print file but are also transmitted to the printing system 3 for directly making a print. The advantage of this embodiment is that, on completion of the set assembly, the first print is already made. If only one copy was wanted that completes the order. If required, the image data can then immediately be removed from the storage device 15 by actuating the correction key 63. This print can also be used to check that the set is correct and then the making of the required number of prints can immediately start.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A digital image reproduction apparatus for assembling a set file of discrete images and reproducing the same on image supports, the apparatus comprising:

an electro-optical scanner for generating digital image data corresponding to an image;

an inputting unit for receiving data, fed from an external digital environment and corresponding to images, and generating digital image data corresponding thereto;

a storage unit for temporary storage of image data generated by the scanner and the inputting unit;

a printing unit for printing, on image supports, images corresponding to image data in the storage unit;

an operating unit provided with operating means operable by an operator;

a control unit connected to the scanner, the inputting unit, the storage unit, the printing unit and the operating unit, said control unit being operable to control the scanner, the inputting unit and the storage unit in response to an associated command from the operating unit so that at least one digital image generated by the scanner and at least one digital image generated by the inputting unit are stored in or added to a set file of discrete images in such manner that image data generated in separate actions by the scanner and the inputting unit are assembled in the storage unit to form said set file, and said control unit being operable to cause each discrete image in said set file to be completely printed by the printing unit in response to an associated command from the operating unit.

2. The apparatus according to claim 1, wherein said inputting unit is also for storing, in a memory, a digital data file received from said external digital environment and wherein said control unit and operating unit are operable together to enable an operator to select a data file stored in said memory, said control unit also being for adding to said collection file digital image data corresponding to the selected data file.

3. The apparatus according to claim 2, wherein said inputting unit includes extracting means for extracting identification data from a digital data file received from said external digital environment and wherein said control unit and said operating unit are operable together to display said identification data to an operator so that he may select a data file.

4. The apparatus system according to claim 1, wherein said inputting unit comprises a connection unit for a digital network.

5. The apparatus system according to claim 1, wherein said inputting unit comprises a read-out station for a storage medium.

6. The apparatus according to claim 1, wherein in each said separate action, the control unit also is operable to store apparatus settings regarding finishing of the printing supports on which the digital image data generated in a given separate action are to be printed, said settings having been selected via the operating means.

7. The apparatus according to claim 6, wherein said apparatus settings include simplex or duplex printing, stapling or not stapling and printing support size.

8. The apparatus according to claim 1, wherein the operating means comprise a first operating element which at all times is reserved for the creation of a set file and for the addition of a digital image data file to said set file or, if a set file has already been created, the addition of a digital image data file to said set file.

9. The apparatus according to claim 8, wherein the inputting unit is operable to store, in unchanged form in the memory, a digital image data file supplied from said external digital environment and wherein the control unit, in response to selection of a stored file followed by operation of the said first operating element, is operable to start a rasterizer for generating a file of printable image data corresponding to the selected file, and also is operable to add the file thus generated to the said set file.

10. The apparatus according to claim 8, wherein the control unit, in response to reception by the inputting unit of a digital image file supplied from a digital environment, is operable to start a rasterizer for generating a file of printable image data corresponding to the received file, and also is operable to store in the memory the file thus generated.

11. The apparatus according to claim 8, wherein said first operating element is operative both for data files generated by the scanner and for data files supplied from a digital environment.

12. The apparatus according to claim 8, wherein the operating means comprise a second operating element, the operation of which, after the first operating element has been operated at least once, has the result that the control unit terminates the assembly of data files and causes the set file to be printed.

13. The apparatus according to claim 8, wherein the operating means comprise a third operating element, the operation of which, after operation of the first operating element, has the result that the control unit removes from the set file the data file which had been added to the set file in response to the last operation of the first operating element.

14. The apparatus according to claim 1, wherein the operating means comprise a display screen for displaying the actual number of images corresponding to the image data in the print file in the storage unit.

15. The apparatus according to claim 1, wherein the control unit is operable to control the apparatus so that, on each addition of image data to the set file in the storage unit, said image data are also printed by the printing unit.

16. A method of assembling a set of images and reproducing the same on image supports, the method comprising the steps of:

generating digitized images in separate actions by scanning at least one image support and receiving from an external digital environment digital data corresponding to at least one image and converting the same to at least one digitized image, respectively;

assembling said digitized images generated in said separate actions of scanning and receiving to form a set file of discrete images in a memory; and printing on image supports each discrete image in said set file.

17. A method according to claim 16, further comprising:

a) storing in a memory a digital image data file supplied from said external digital environment; and b) offering for selection by an operator data files, stored in the memory and that have been received from said external digital environment, for the purpose of adding the same to said set file.

18. The method according to claim 17, further including:

extracting identification data from a digital data file received from said external digital environment; and displaying said identification data to said operator so that he may select a data file.

19. The method according to claim 17, wherein said step a) includes:

storing unchanged in said memory a given digital image data file supplied from digital environment; and converting said given digital image data file to digitized images only in response to selection and an addition command thereof, respectively.

20. A method according to claim 17, further including converting a given digital image data file supplied from said external digital environment to digitized images and storing said digitized images in the memory.

21. The method according to claim 16, further including:

removing, responsive to a command of an operator, the digitized image or images generated and added during the last separate action from the set file.

22. The method according to claim 16, further including:

displaying the actual number of digitized images in the set file on a display screen.

23. The method according to claim 16, further including:

enabling, in each said separate action, operator to select apparatus settings regarding finishing of the printing supports on which the digital image data generated in a given separate action are to be printed; and storing said apparatus settings.

24. The method according to claim 23, wherein said apparatus settings include simplex or duplex printing, stapling or not stapling and printing support size.

25. The method according to claim 16, wherein, at each addition of a digitized image to the set file, printing an image corresponding thereto on an image support.

* * * * *